Figure 1:

(No Model.)

E. F. PHILLIPS.
ELECTRIC CONDUCTOR.

No. 421,968. Patented Feb. 25, 1890.

Witnesses.
Frank C. Lockwood
J. Albert McCabe

Inventor.
Eugene F. Phillips
by Geo. Willis Pierce
Attorney

UNITED STATES PATENT OFFICE.

EUGENE F. PHILLIPS, OF PROVIDENCE, RHODE ISLAND.

ELECTRIC CONDUCTOR.

SPECIFICATION forming part of Letters Patent No. 421,968, dated February 25, 1890.

Application filed November 18, 1889. Serial No. 330,732. (No model.)

*To all whom it may concern:*

Be it known that I, EUGENE F. PHILLIPS, residing at Providence, in the county of Providence and State of Rhode Island, have invented certain Improvements in Electric Conductors, of which the following is a specification.

This invention relates to the manufacture of insulated wire for the conveyance of currents of electricity; and its object is the production of an insulated conductor adapted to be efficiently used in places where any suspended wire is liable to constant contact with fixed and rigid objects, and therefore subject to abrasion, and which can be repeatedly subjected to such contacts and, in fact, for a long period of time to constant friction without material abrasion or injury resulting therefrom.

Frequently in stringing electric-light, telephone, or other electric conductors their line of route necessarily passes through the foliage of trees, in which case it is necessary to use covered wire; but at such places the said wire is often either unavoidably left in permanent contact with branches of the trees through which it passes or the said branches are by the wind or otherwise brought intermittently into contact with the wire. This has uniformly tended to abrasion of the insulating-covering, and the oft-repeated contact, attended by a rubbing or saw-like motion, has uniformly resulted in the wearing away of the covering at such points, soon leaving the wire entirely bare, and ultimately in the establishment of a permanent fault or escape on the wire. Similar contingencies often occur when a conducting-wire is required to turn a sharp corner round a building, or where from any cause it is found necessary to leave the covered wire in contact with any hard surface or edge. To the end that such results may be avoided and that even in exposed places the serious abrasion of insulated wire may be greatly retarded and in a great measure prevented, I have devised an insulated conductor which is first insulated to a certain thickness and which has applied over this first insulation a braided open-work or coarsely-braided netting or open covering formed of an equal number of fine wires (preferably soft iron) and of cords or twines, (preferably hard-twisted cords.) The cords are of somewhat larger diameter than the wire, so that, although the two are braided together, the outer circumference of the braided cord is larger than the outer circumference of the braided wire, and not only so, but, as the braids of the cord at many points are undermost and lie between the wires and the inner insulation, their superior thickness tends also to relieve the said insulation from any strain due to the wires and to form for the said braided wires a kind of supporting-cushion wherein they may rest, serving as a species of skeleton or protecting shell for the complete conductor, but prevented from harming the soft parts inclosed by it by reason of the interwoven cords of superior thickness. The cord-and-wire open-work is braided or woven loosely over the insulated wire, so that it has a tendency to stand away from it, and over all an outer insulation is applied, which, being when applied of a plastic glutinous character, closely encircles and immerses the compound braided cord-and-wire open-work, thus attaching itself the more firmly to the conductor, and when so completed the larger cord assumes with respect to the outer insulation also the same function which it fulfills with respect to the inner coating—namely, that of a buffer between the said layers and the wire element of the braid—which adds the required strength to the combination.

Figure 2:
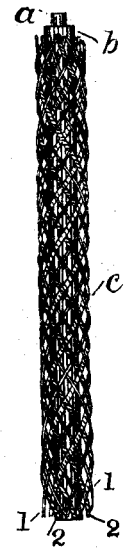
Figure 3:
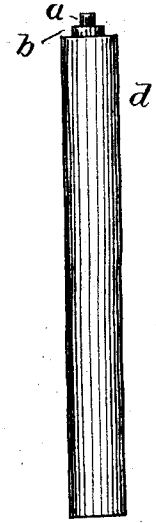

In the drawings which illustrate and form a part of this specification, Figure 1 is an elevation view of the insulated conductor prior to the application of the braided wire and cord. Fig. 2 is the same conductor, the said braid having been applied; and Fig. 3 represents the completed conductor.

In the figures, *a* is the conducting line-wire, which in Fig. 1 is shown as being simply covered by any suitable insulation *b*. The insulated conductor *a b* is, as shown in Fig. 2, then surrounded with the braided or woven open-work *c*, this being applied by the usual braiding-machines in a manner well understood. The braided open-work is compounded of metal wires 1 (preferably of soft iron, which is ductile, as well as being strong and cheap) and fibrous cords or twine 2.

It is of the greatest importance that the cord element of the braid shall be larger in some degree than the wire element, and in this respect the drawings may be considered as representing with substantial accuracy the relative sizes of the two elements in an insulated conductor of any size not materially greater than that shown. In forming the said braid an equal number of wires and cords are employed, and the braided open-work, considered as a whole, while applied to the surface of the insulated conductor and in contact therewith, is applied loosely thereover, as shown, so that of itself it exerts no pressure thereon. A suitable outer insulation $d$ is then applied over the woven open-work, and Fig. 3 represents the finished conductor after such application. When an originally-plastic non-conducting outer covering—such as rubber or any asphaltic or bituminous compound (which is preferable)—is applied, the said compound totally envelops the braided wires and cords, edging itself thereunder and surrounding the same on all sides, and the open-work constructed thereof thus forming a foundation or base-work, as it were, tending to hold the mass together and in place round the core. The corded element of the braid being, as described, larger than the wires thereof, it is obvious that the said wires are prevented thereby from exercising any pressure on the inner core, and in case of a blow or friction from any external body received upon or experienced by the outer coating of insulation the impact would also be first received upon the outer periphery of the cord. By such means, while the wire braid materially adds strength to the conductor, it is prevented from cutting either outer or inner insulation, as were the cord and wire of similar size it would tend to do. Thus the cord part of the braid acts as a buffer or cushion between the wire portion and the insulating medium on either side thereof.

The wire, if made of iron, is to be soft, so as to braid easily, and, when braided, to readily maintain its form. It forms the spiral column and provides the strength of the covering, while the cord acts as the buffer and gives flexibility.

It will readily be seen that a compound insulated conductor of this construction, being both strong and elastic, has the elements of durability in the most adverse surroundings, and may be relied upon to successfully oppose abrasion even when long continued.

I desire to state that although I have spoken of the braided covering as being an open-work, I do not thereby intend to restrict myself to any specific degree of closeness or openness between the several wires or corded fibers of said braid; and it will be understood that my invention is embodied in any insulated conductor in which a braided layer compounded of threads and wires is interposed between an inner and outer layer of insulation.

I claim—

1. An electric conducting-wire having an inner and outer coating of insulation and an interposed woven or braided layer composed of mingled twines or cords and metal wire.

2. In an insulated conducting-wire, the compound braided or woven layer made of an equal number of wires and cords or twines braided over the inner insulated core and surrounded by and embodied in an outer insulation, substantially as specified, and for the purposes described.

3. The combination, substantially as hereinbefore described, with an insulated conductor of electricity, of a loosely-surrounding braid therefor formed of an equal number of iron wires and cords or twines and an outer enveloping coat of insulation for the whole applied over and intermingling with the elements of said braid, substantially as described.

4. An insulated electric conductor, combined with a loosely-surrounding covering braided or woven thereon and compounded of intermingled iron wires and twines or cords, the said cords being larger than said wires, as described, and an outer insulating-covering surrounding the said braided layer and supported upon the said thread, substantially as specified.

5. The combination of a conducting-wire, provided with an initial coating of insulation and with an independent and separate external insulating-envelope, with a protecting-sheath interposed between the said two coatings and composed of an equal number of iron wires and cords or twines braided together and loosely surrounding the inner insulation, the said cords being larger than the wires, and being thereby adapted to support the same within the insulation and to serve as a buffer or cushion between the said wires and the inner and outer insulating-coatings, substantially as described.

In testimony whereof I have signed my name to this specification, in the presence of two subscribing witnesses, this 15th day of November, 1889.

EUGENE F. PHILLIPS.

Witnesses:
GILMAN E. JOPP,
CHARLES E. HAVENS.